Feb. 19, 1957  E. C. TAYLOR  2,781,885
ARTICLE FEEDING AND INSPECTION MACHINE
Filed July 3, 1953  2 Sheets-Sheet 1
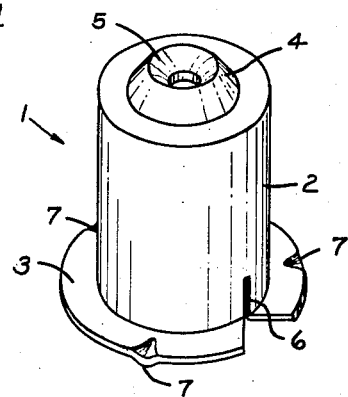
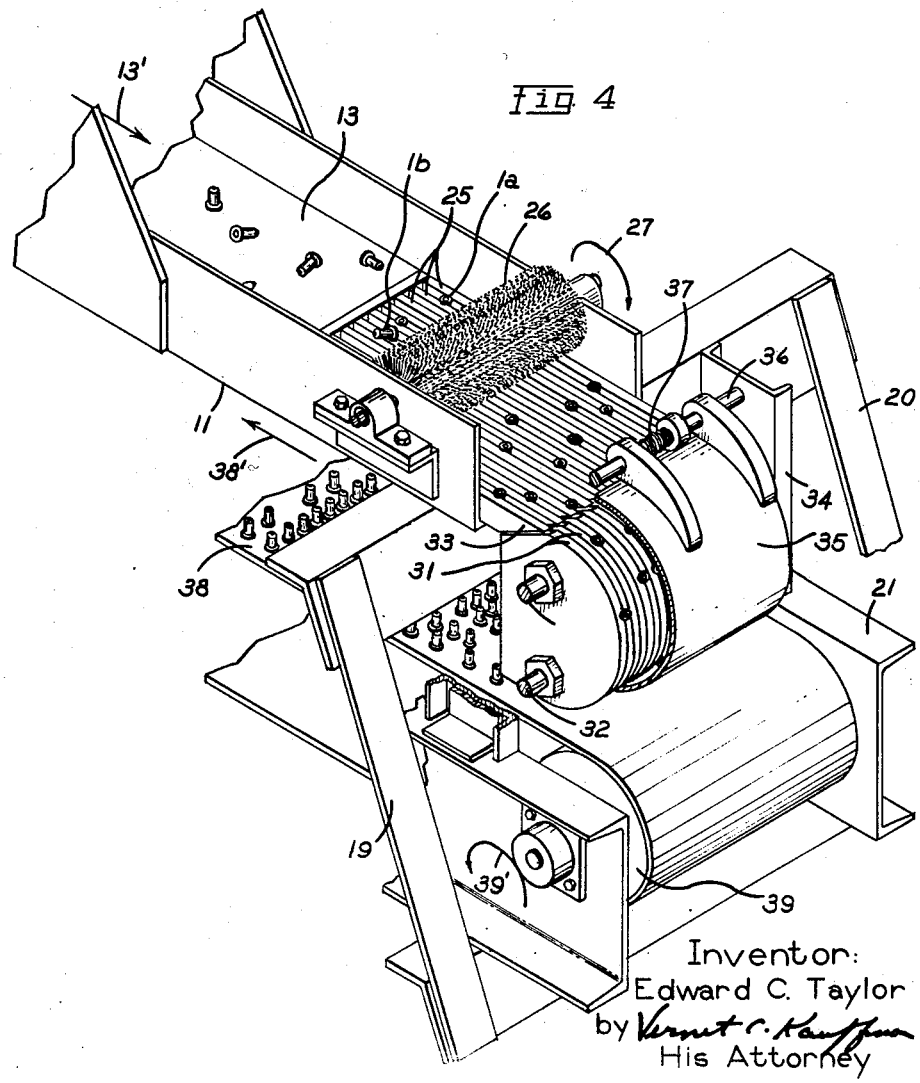
Inventor:
Edward C. Taylor
by Vernet C. Kauffman
His Attorney Feb. 19, 1957   E. C. TAYLOR   2,781,885
ARTICLE FEEDING AND INSPECTION MACHINE
Filed July 3, 1953   2 Sheets-Sheet 2
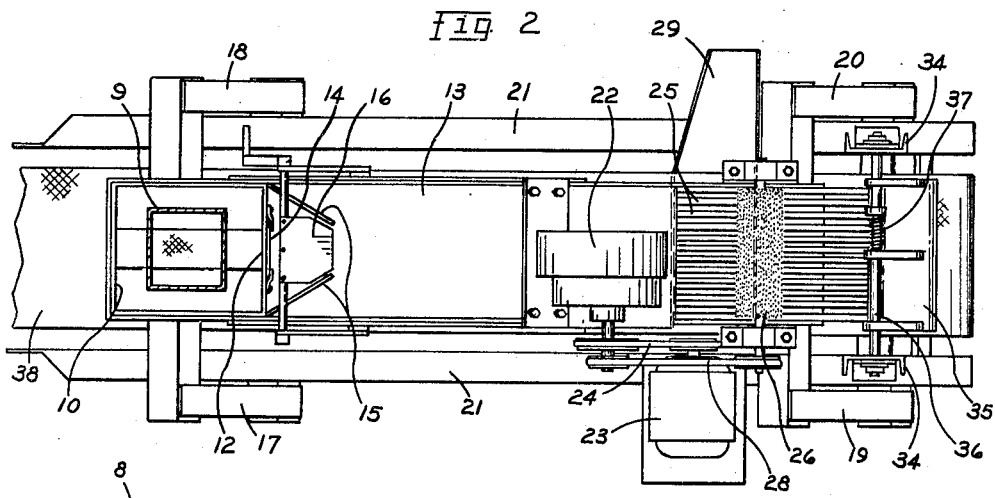
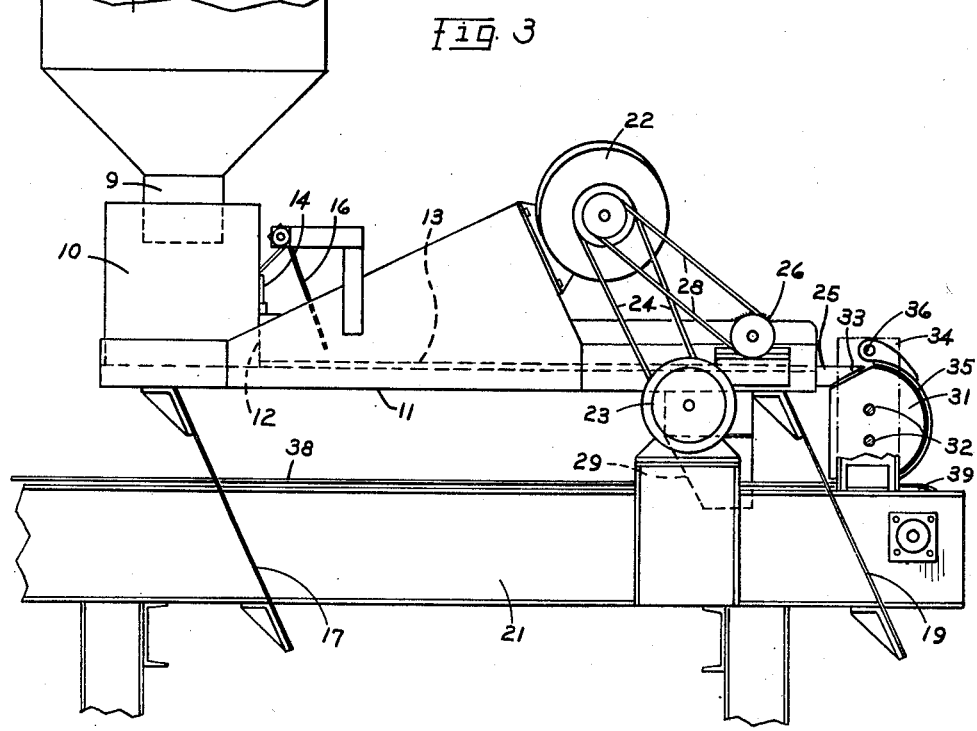
Inventor:
Edward C. Taylor
by Kauffman
His Attorney United States Patent Office 2,781,885
Patented Feb. 19, 1957

2,781,885

ARTICLE FEEDING AND INSPECTION MACHINE

Edward Crisp Taylor, Johnston, R. I., assignor to General Electric Company, a corporation of New York Application July 3, 1953, Serial No. 365,941

7 Claims. (Cl. 198—33)

This invention relates generally to the feeding of articles in alignment and in a given orientation onto conveyors. More particularly, it relates to a base inspection machine for inspecting flanged bases such as are used with miniature pre-focused incandescent lamps for flash lights.

An object of the present invention is to provide apparatus facilitating the inspection of flanged bases for incandescent lamps.

Another object is to provide a machine operating to automatically feed flanged bases for electric lamps past a point of observation, in aligned rows and according to a given aspect or orientation.

A more specific object of the invention is to provide a machine feeding flanged electric lamp bases out of a hopper and into aligned rows onto a moving belt conveyor whereon they are seated flange-down.

In the illustrated embodiment of the invention, the flanged bases are fed out of a suitable reservoir or hopper wherein they are bulked, onto an orienting means which accommodates the bases in a flange-up aspect. The orienting means comprises a grid composed of a plurality of parallel spaced bars which define channels in which the bases are received in dependent fashion, being supported between the bars by their flanges which ride on top of the bars. The bases are caused to progress through the grid, preferably by imparting to it a diagonal vibratory movement relative to the direction of advance. At a suitable point along the grid, a means is provided to prevent any further advance of non-oriented bases; in the illustrated embodiment, this means comprises a counter-rotating brush positioned above the grid to sweep back any bases which are not advancing in dependent fashion between the bars. Thereafter, the bases are delivered flange-down by means of spaced arcuate guide members aligned at their upper ends with the bars and forming reverted channels. As illustrated, the arcuate guide members are in the form of spaced semicylindrical plates whose upper ends are aligned with the bars of the grid. A curved cover over the plates constrains the bases to progress around the plates. The lower ends of the plates are positioned immediately above a moving belt conveyor on which the bases are deposited flangedown to be carried to the inspection point where an operator removes any that are defective.

For further objects and advantages and for a better understanding of the invention, attention is now directed to the following detailed description and accompanying drawings. The features of the invention, believed to be novel, will be more particularly pointed out in the appended claims.

In the drawings,

Fig. 1 is a pictorial view of a flanged base for miniature incandescent lamps, such as the illustrated embodiment of the invention is adapted to handle.

Fig. 2 is a plan view of a miniature flanged base inspection machine embodying the invention.

Fig. 3 is a side elevation view of the same machine.

Fig. 4 is a pictorial view of a portion of the machine illustrating the orienting grid and the arcuate guide which delivers the bases flange-down onto the belt conveyor, certain parts being omitted for greater clarity.

Referring to Fig. 1, there is shown a base 1 of a flange type which is manufactured in large quantities for use in miniature pre-focused incandescent lamps for flash lights. The base comprises a thin-walled cylindrical shell 2, generally made of brass, and which is outwardly flared into a flange 3 at its inner end where the bulb is fastened. The outer end of the shell is provided with a conical insulating web 4 of glass or plastic which is capped by an end contact or eyelet 5. The lead-in wires of the bulb in the completed lamp are soldered to the end contact 5 and to the shell 2 within the lateral slot 6. The three shallow bosses 7 in the flange are for assuring even seating of the lamp in its socket.

The inspection of lamp bases of the type shown requires that the exterior surfaces be examined for imperfections. It will readily be appreciated that manual inspection of the bases out of bulk is exceedingly tedious and expensive from the point of view of the labor required. In the inspection of bases with the aid of mechanical devices, the task of the operator is greatly facilitated when the articles to be inspected are all carried past the observation point in orderly rows and in a given uniform aspect or orientation. Under such circumstances, any defective articles stand out and are readily perceived by the inspector, who removes them from the conveyor. In the case of the flanged base illustrated, since it is desired to examine the exterior surfaces, the preferred aspect of the base on the conveyor for inspection purposes will be flange-down. However, the bases will not naturally assume that aspect when merely unloaded out of bulk onto a conveyor. The present machine accomplishes that result and places the bases in organized rows on a moving belt conveyor which carries them past the inspection point.

Referring to Figs. 2 and 3, the machine is provided with a receiving hopper 8 into which the bases to be inspected are dumped. The capacity of the hopper may be equivalent to approximately a standard barrel of bases. For greater clarity, the receiving hopper is not shown in Fig. 2 except for its outlet portion 9 which appears in section. The bases feed through the outlet into a smaller secondary hopper 10 which is mounted on a vibrating frame 11. The bases flow out of the secondary hopper through the opening 12 into a channelling pan 13. The size of the opening 12 is regulated by an adjustable gate 14. The flow of bases is also controlled by the adjustable side baffles 15 and by a sweep 16 which is used to retard the bases when an excess flows onto the vibrating pan.

The bases may be caused to advance through the channelling pan, that is to progress to the right as illustrated in Figs. 2 and 3, in a variety of ways. In the illustrated embodiment, the progression is achieved by what is sometime known as a differential or diagonal vibration. The secondary hopper 10 and the channelling pan 13 are mounted in the desired spaced relationship on a rectangular frame 11. The frame is resiliently supported at its four corners by leaf spring members 17 to 20, which project diagonally upward from base frame 21. The leaf springs make an acute angle with the vibrating frame 11 along the direction in which it is desired for the bases to progress, that is to the right as seen in Fig. 3. In consequence of the mode of mounting, when the frame is vibrated the vibrations occur along a diagonal such that a component of displacement of the frame to the right is combined with an upward component, whereas a component of displacement to the left is combined with a downward component. As a result, the increased pressure of the bases upon the pan when its vibratory displacement is to the right produces increased friction, thereby causing the bases to progress to the right, that is to flow away from the secondary hopper 10. The vibration of the frame is effected through a well-known form of vibrator 22 which comprises a rotating eccentric weight, driven by electric motor 23 through belt coupling 24. The frequency of rotation of the vibrator, and in consequence thereof the frequency of vibration of the frame, may be varied widely to suit the size of the lamp base and in accordance with the rate of feed desired.

The bases flow through the channelling pan, moving in the direction indicated by arrow 13' in Fig. 4, onto an orienting grid made up of spaced parallel bars 25 which are fastened to the vibrating frame 11 and vibrate with it. The bars are spaced such that the shells of the bases are accommodated in the channels between them when the bases are oriented flange-up and are depending by their flanges from the bars. The vibration of the grid and the progression of the bases along it causes the great majority of the bases to become seated in dependent fashion within the channels very quickly. However, for such few bases as fail to become properly oriented and seated within the channels, there is provided a counter-revolving brush 26 which is rotated in the direction of the arrow 27 (Fig. 4) by means of belt 28 from the vibrator 22, and thereby from the electric motor 23. The brush is raised a slight distance above the surface of the parallel bars forming the grid such that bases 1a which are progressing along the bars and supported by their flanges in dependent fashion are not touched and pass through unimpeded. However, any non-oriented bases 1b which are riding on top of the bars are brushed back toward the channelling pan. With further vibration, such bases as have been brushed back finally become properly oriented in dependent fashion and then pass through under the revolving brush. The scrap discharge chute 29 located under the grid catches any metal scrap which may have become entangled and carried along with the bases and which falls through the bars.

At the end of the grid of parallel bars, there is provided a turn-over section comprising a stack of semi-circular plates 31 with spacers in between and held together by draw-bolts 32. These plates are spaced the same distance apart as the parallel bars 24 of the vibrating grid and have their upper ends aligned with the wedge-shaped overlapping ends of the bars at 33. This construction permits the bases to transfer smoothly from the vibrating grid to the non-vibrating stack of plates which is supported from the base frame 21 by brackets 34 and independently of the vibrating frame 11. The outer surfaces of the semicircular plates are highly polished and preferably chrome-plated to facilitate the flow of the bases around their periphery. The periphery of the plates thus form reverted channels for the bases. A curved cover 35 fits around the plates, sufficient clearance being provided for the flanges of the bases. The bases are thus constrained to progress through the channels and to arrive at their lower ends in a flange-down orientation. The cover is supported from a transverse rod 36 and spring pivoted with respect thereto at 37; this arrangement allows the cover to be swung up when it is necessary to remove any bases that may have become jammed between the plates.

As the bases flow out at the lower end of the turn-over section, they land flange-down on a flat fabric endless conveyor belt 38 moving in the direction indicated by the arrow 38'. The belt is supported in part by a roller 39 rotating as indicated by arrow 39'. The bases are thus deposited on the belt conveyor in orderly rows and in a uniform orientation, that is flange-down, and carried in that fashion to the inspection point in front of the inspector where the poor quality work is removed. At the end of the conveyor, the good bases may be transferred to another conveyor for further processing or dropped into a carton for storage.

While a certain specific embodiment of the invention has been shown and described, it will of course be appreciated that various modifications may be made without essential departure therefrom. Furthermore, the particular base which has been illustrated is but one of several flange types and sizes which may readily be accommodated by the present invention through slight changes in the dimensions of the bars constituting the orienting grid and the semi-circular plates forming the turn-over section. The appended claims are intended to cover any such modifications coming within the true spirit and scope of the invention.

What I claim as new and desire to secure by Letters Patent of the United States is:

1. Apparatus for feeding flanged cylindrical articles, comprising an orienting means receiving said articles in bulk and including a plurality of spaced members defining parallel channels capable of accommodating in dependent fashion said articles oriented flanged-up, means for imparting a diagonal vibration to said orienting means for advancing said articles through said channels, and means for delivering said articles flange-down comprising a plurality of spaced arcuate guide members aligned at their upper ends with said members and forming reverted channels, and means constraining said articles to progress through said reverted channels.

2. Apparatus for feeding flanged cylindrical articles, comprising an orienting grid receiving said articles in bulk and including a plurality of parallel spaced bars defining channels capable of accommodating said articles oriented flange-up and depending by their flanges from said bars, means for imparting a diagonal vibration to said orienting means for advancing said articles along said bars, means preventing the advance of non-oriented articles beyond a given point, and means for delivering said articles flange-down comprising a plurality of spaced arcuate guide members aligned at their upper ends with said bars and forming reverted channels, and means constraining said articles to progress through said reverted channels.

3. Apparatus for feeding flanged bases, comprising a hopper for bulked bases, orienting means receiving said bases from said hopper and including a plurality of spaced members defining parallel substantially horizontal channels capable of accommodating in dependent fashion bases oriented flange-up, means for imparting a vibration to said orienting means wherein a component of displacement in the forward direction relative to said channels is combined with an upward component in order to cause said bases to advance through said channels, and means for delivering said bases flange-down comprising a plurality of spaced arcuate guide members aligned at their upper ends with said members and forming reverted channels, and means constraining said bases to progress through said reverted channels.

4. Apparatus for feeding flanged bases, comprising a hopper for bulked bases, an orienting grid receiving said bases from said hopper and including a plurality of parallel substantially horizontal spaced bars defining channels capable of accommodating bases oriented flange-up and depending by their flanges from said bars, means for imparting a vibration to said bars wherein a component of displacement in the forward direction relative to said channels is combined with an upward component in order to cause said bases to advance along said bars, means preventing the advance of non-oriented bases beyond a given point, and means for delivering said bases flange-down comprising a plurality of semicircular spaced guide members aligned at their upper ends with said bars and forming reverted channels, and means constraining said bases to progress through said reverted channels.

5. Apparatus for feeding flanged bases, comprising a hopper for bulked bases, a channelling pan receiving said bases from said hopper, an orienting grid at the end of the channelling pan remote from the hopper and including a plurality of parallel spaced bars defining channels capable of accommodating bases oriented flange-up and depending by their flanges from said bars means for imparting a diagonal vibration to said channelling pan and to said orienting grid wherein a forward component of displacement is combined with an upward component whereby to cause said bases to progress therethrough, means preventing the advance of non-oriented bases beyond a given point, and means for delivering said bases flange-down comprising a plurality of semicircular spaced plates corresponding in thickness to said bars and aligned therewith at their upper ends to form reverted channels, and means constraining said bases to progress through said reverted channels.

6. An inspection machine for flanged bases comprising a hopper for bulked bases, a channelling pan receiving said bases from said hopper, an orienting grid at the end of the pan remote from the hopper and including a plurality of parallel spaced bars defining channels capable of accommodating bases oriented flange-up and depending by their flanges from said bars, a frame supporting said channelling pan and orienting grid and a plurality of inclined leaf springs supporting said frame, means for vibrating said frame whereby to cause said bases to progress through said pan and grid, a counter-revolving brush positioned above said grid to prevent the advance of non-oriented bases beyond it by sweeping such bases back toward said pan, a movable flat conveyor belt below said frame, and means for delivering said bases flange-down upon said conveyor comprising a plurality of semicircular spaced plates corresponding in thickness to said bars and aligned therewith at their upper ends and forming reverted channels, and a cover over said plates to constrain said bases to progress through said reverted channels whereby to be deposited flange-down and in organized rows upon said conveyor belt.

7. Apparatus for feeding flanged cylindrical bases comprising a channelling pan receiving bases in bulk, an orienting grid at the forward end of the pan including a plurality of substantially horizontal parallel spaced bars defining channels capable of accommodating bases oriented flange up and depending by their flanges from said bars, a frame supporting said channelling pan and orienting grid and a plurality of inclined leaf springs supporting said frame, said springs being disposed in a vertical plane parallel to said bars and making an acute angle with the frame in the direction of advance of the bases therethrough, means for vibrating said frame whereby to cause said bases to progress through said pan and grid, means preventing the advance of nonoriented bases beyond a given point, said bars being terminated at their forward ends in wedge-shaped portions, and means for delivering said bases flange down comprising a plurality of semicircular spaced plates corresponding in thickness to said bars and aligned therewith at their upper ends disposed to be overlapped by the wedge-shaped ends of said bars, said semicircular plates forming reverted channels dropping away from the ends of said bars, and a cover over said plates to constrain said bases to progress through said reverted channels whereby to be deposited flange down at the ends thereof.

References Cited in the file of this patent
UNITED STATES PATENTS

| | | |
|---|---|---|
| Re. 21,015 | Dilger | Feb. 28, 1939 |
| 332,826 | Perry | Dec. 22, 1885 |
| 1,921,485 | Seger | Aug. 8, 1933 |
| 2,252,498 | Flaws | Aug. 12, 1941 |
| 2,383,528 | Winters | Aug. 28, 1945 |
| 2,392,509 | Sells | Jan. 8, 1946 |